(12) United States Patent
Takeyama et al.

(10) Patent No.: US 10,305,134 B2
(45) Date of Patent: May 28, 2019

(54) FUEL CELL

(71) Applicants: TOYOTA JIDOSHA KABUSHIKI KAISHA, Toyota-shi, Aichi-ken (JP); TOYOTA BOSHOKU CORPORATION, Kariya-shi, Aichi (JP)

(72) Inventors: Makoto Takeyama, Toyota (JP); Koji Kume, Kariya (JP)

(73) Assignees: Toyota Jidosha Kabushiki Kaisha, Toyota-shi, Aichi-ken (JP); Toyota Boshoku Corporation, Kariya-shi, Aichi (JP)

( * ) Notice: Subject to any disclaimer, the term of this patent is extended or adjusted under 35 U.S.C. 154(b) by 185 days.

(21) Appl. No.: 15/033,735

(22) PCT Filed: Oct. 24, 2014

(86) PCT No.: PCT/JP2014/005399
§ 371 (c)(1),
(2) Date: May 2, 2016

(87) PCT Pub. No.: WO2015/068350
PCT Pub. Date: May 14, 2015

(65) Prior Publication Data
US 2016/0254564 A1 Sep. 1, 2016

(30) Foreign Application Priority Data
Nov. 11, 2013 (JP) .................... 2013-233204

(51) Int. Cl.
*H01M 8/2465* (2016.01)
*H01M 8/2483* (2016.01)
(Continued)

(52) U.S. Cl.
CPC ....... *H01M 8/2465* (2013.01); *H01M 8/0247* (2013.01); *H01M 8/04201* (2013.01);
(Continued)

(58) Field of Classification Search
CPC ... H01M 8/0247; H01M 8/04201; H01M 8/24
See application file for complete search history.

(56) References Cited

U.S. PATENT DOCUMENTS

| 2010/0062319 A1 | 3/2010 | Katano et al. |
| 2010/0209797 A1 | 8/2010 | Katano et al. |
| 2014/0011109 A1 | 1/2014 | Katano |

FOREIGN PATENT DOCUMENTS

| CN | 101536233 A | 9/2009 |
| JP | 2008-130446 | 6/2008 |

(Continued)

*Primary Examiner* — James Lee
(74) *Attorney, Agent, or Firm* — Finnegan, Henderson, Farabow, Garrett & Dunner, LLP

(57) ABSTRACT

A fuel cell (100) includes an end plate cover (200) to which a sound-absorbing member (210) is attached and an injector block (180) in an end plate (170F) on one end side of a cell stack (102S). The sound-absorbing member (210) is attached to a sound-absorbing seating surface (203) forming a gas introduction path (202) of the end plate cover (200) which merges a gas jetted from injectors (180a to 180c) to guide it to a fuel gas supply path in a cell coupling portion (170Fc), and is fixed to a convex column (205) in a state in which the convex column (205) is inserted to a through hole (211).

7 Claims, 5 Drawing Sheets

(51) Int. Cl.
*H01M 8/0247* (2016.01)
*H01M 8/247* (2016.01)
*H01M 8/2475* (2016.01)
*H01M 8/04082* (2016.01)
*H01M 8/2457* (2016.01)
*H01M 8/0258* (2016.01)

(52) U.S. Cl.
CPC ......... *H01M 8/247* (2013.01); *H01M 8/2475* (2013.01); *H01M 8/2483* (2016.02); *H01M 8/0258* (2013.01); *H01M 8/2457* (2016.02); *H01M 2250/20* (2013.01); *Y02T 90/32* (2013.01)

(56) References Cited

FOREIGN PATENT DOCUMENTS

| | | | |
|---|---|---|---|
| JP | 2008-130492 | 6/2008 | |
| JP | 2010-267553 | 11/2010 | |
| JP | 2012-17835 | 1/2012 | |
| JP | 2012-156033 A | 8/2012 | |
| JP | 2012-195176 | 10/2012 | |
| WO | WO 2012/123794 | * 9/2012 | .............. H01M 8/02 |

* cited by examiner

FUEL CELL

CROSS-REFERENCE TO RELATED APPLICATIONS

This application is a national phase application of International Application No. PCT/JP 2014/005399, filed Oct. 24, 2014, and claims the priority of Japanese Application No. 2013-233204, filed Nov. 11, 2013, the content of both of which is incorporated herein by reference.

TECHNICAL FIELD

The present invention relates to fuel batteries.

BACKGROUND ART

A fuel cell has a stack structure in which a plurality of cells of a fuel cell as power generation units are stacked in layers, and for example, Japanese Unexamined Patent Application Publication No. 2012-156033 proposes a method of performing the supply of a fuel gas to the cells of the fuel cell from an injector attached to an end plate at one end of the stack.

Although in the gas supply method proposed by the patent reference described above, it is possible to unify a fuel gas supply pipe system around the fuel cell, the following problems are encountered. Not only the fuel cell is used as a power generation source by being incorporated and installed in a fixed structure such as a power generation system but also the fuel cell is often used as a drive power source by being mounted on a vehicle. Although in the mounting of the fuel cell on the vehicle, the mounting position for the fuel cell is not particularly limited, in terms of the acquisition of quietness of a vehicle interior, it is preferable to reduce noise in a power generation operation. Since in the cells of the fuel cell, an electrochemical reaction of the fuel of a fuel gas supplied and the oxygen of an oxidizing gas (for example, air) only proceeds, mechanical vibrations are prevented from being produced in cell constituent members, with the result that noise caused by vibrations is not problematic in the cells of the fuel cell themselves. However, since the injector attached to the end plate repeatedly performs gas blowout in the power generation operation of the fuel cell, the injector can be a vibration source to cause vibrations not only in the injector but also in the end plate, with the result that an unusual sound may be produced. This problem is likewise encountered when the fuel cell is incorporated in a fixed structure. Since in the patent reference described above, it is not assumed at all that the injector fitted to the end plate can be a vibration source, it is required to reduce noise in the power generation operation of the fuel cell. It is also required to reduce a cost necessary for the noise reduction, the cost of the fuel cell and the manufacturing cost thereof and the like.

SUMMARY

In order to solve at least part of the problems described above, the present invention may be practiced in aspects below.

According to a first aspect, a fuel cell is provided. The fuel cell according to the first aspect includes: a cell stack configured to have a stack structure including a plurality of cells as power generation units being stacked in layers; an end plate attached to one end of the cell stack; an injector attached to the end plate and configured to jet a fuel gas; a path provided in the end plate so as to guide the fuel gas jetted from the injector to the cell stack; and a sound-absorbing member attached to a portion. of a plate surface of the end plate which corresponds to the path. In the fuel cell according to the first aspect, since the sound-absorbing member is provided in the portion corresponding to the path of the fuel gas jetted from the injector, even when vibrations are produced in the injector or in the end plate attached to the injector as the gas is jetted, it is possible to reduce or prevent noise caused by the vibrations.

In the fuel cell according to the first aspect, the end plate may have a convex portion formed on the plate surface, and the sound-absorbing member may have an insertion portion to which the convex portion is inserted, and the end plate may fix the sound-absorbing member to the convex portion in a state in which the convex portion is inserted to the insertion portion of the sound-absorbing member. In the fuel cell according to this aspect, since the sound-absorbing member contributing to the reduction of the noise is only fixed to the convex portion by making the end plate is inserted to the insertion portion, it is possible to simplify a structure for fixing the sound-absorbing member to the end plate, to reduce the space thereof and to reduce a cost produced by the simplification of the structure. Since in the fuel cell of this aspect, the existing end plate to which the injector is attached is simply replaced with the end plate included in the fuel cell of the aspect described above, it is possible to reduce the manufacturing cost of the fuel cell.

In the fuel cell according to the first aspect, the end plate may have, in the portion to which the sound-absorbing member is attached, a locating portion for locating the sound-absorbing member. In this case, since the sound-absorbing member is prevented from being moved unexpectedly, it is possible to reduce the noise or sustain the noise prevention effect.

In the fuel cell according to the first aspect, the sound-absorbing member may be fixed to the convex portion with a screw that is screwed to the convex portion from a top surface of the convex portion. In this case, it is possible to easily fix the sound-absorbing member and to simplify the replacement thereof.

In the fuel cell according to the first aspect, the end plate may have an end plate cover that forms the path, the plate surface may be an outer surface of the end plate cover and the convex portion may be formed on the end plate cover. In this case, since the sound-absorbing member can be previously fixed to the end plate cover, the end plate cover to which the sound-absorbing member is fixed is just fixed.

The present invention can he realized with various aspects such as the aspects of the end plate of a fuel cell, the cell stack of a stack structure in which a plurality of fuel cell cells are stacked in layers, a method of manufacturing a cell stack or a fuel cell and a sound-absorbing structure of a fuel cell.

DESCRIPTION OF EMBODIMENTS

Figure 1:
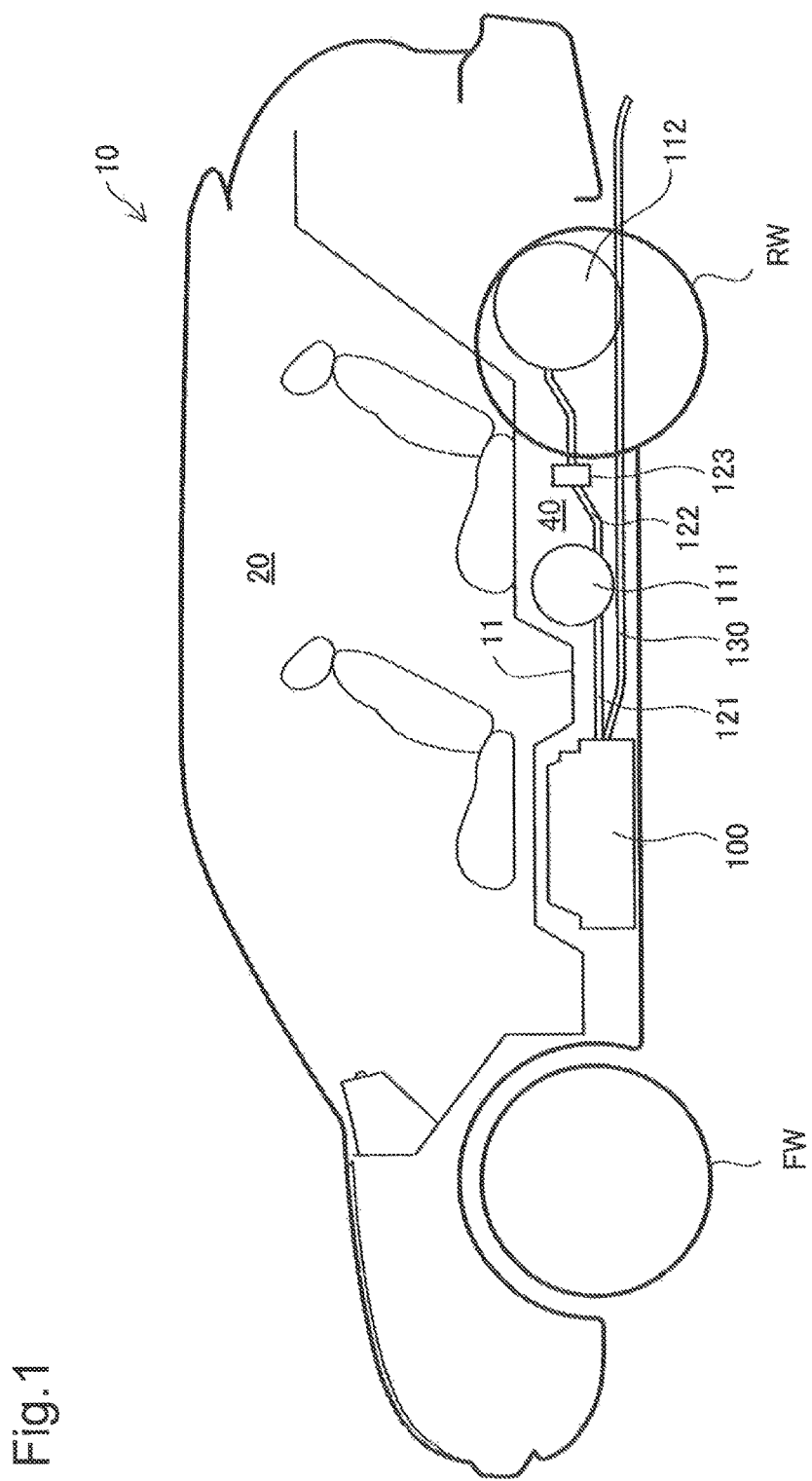
FIG. 1 is an illustrative view schematically showing the configuration of a vehicle in an embodiment of the present invention.

An embodiment of the present invention will be described below with reference to drawings. FIG. 1 is an illustrative view schematically showing the configuration of a vehicle 10 in the embodiment of the present invention. The vehicle 10 of the present embodiment includes a fuel cell 100, a first gas tank 111 and a second gas tank 112. The fuel cell 100 is horizontally mounted on the lower side of an underbody 11 that partitions a vehicle interior 20, that is, on a vehicle interior underfloor region 40 between a front wheel FW and a rear wheel RW, receives the supply of a hydrogen gas and an oxygen gas and thereby performs power generation. The generated power is transmitted to an unillustrated motor and is used as the drive force of the vehicle 10.

Both the first gas tank 111 and the second vas tank 112 are horizontally mounted in a lower portion of the underbody 11, are extended in a vehicle width direction, are mounted, in a vehicle forward/backward direction, on the side of the rear wheel RW with respect to the fuel cell 100 and store the hydrogen gas. The second gas tank 112 is horizontally mounted between the opposite rear wheels RW so as not to interfere with the vehicle shaft of the rear wheels RW. The first gas tank 111 is horizontally mounted in an intermediate position between the fuel cell 100 and the second gas tank 112, and is connected to the fuel cell 100 via a hydrogen first supply pipe 121. The first gas tank 111 and the second gas tank 112 are connected to each other via a hydrogen second supply pipe 122, and in the hydrogen second supply pipe 122, an opening and closing valve 123 is arranged. The hydrogen first supply pipe 121 and the hydrogen second supply pipe 122 include the opening and closing valve 123 to form a gas supply system, and supplies the hydrogen gas from both the first gas tank 111 and the second gas tank 112 to the fuel cell 100 under drive control performed by a control device (not shown) of an unillustrated cap valve attached to the tank and the opening and closing valve 123.

Figure 2:
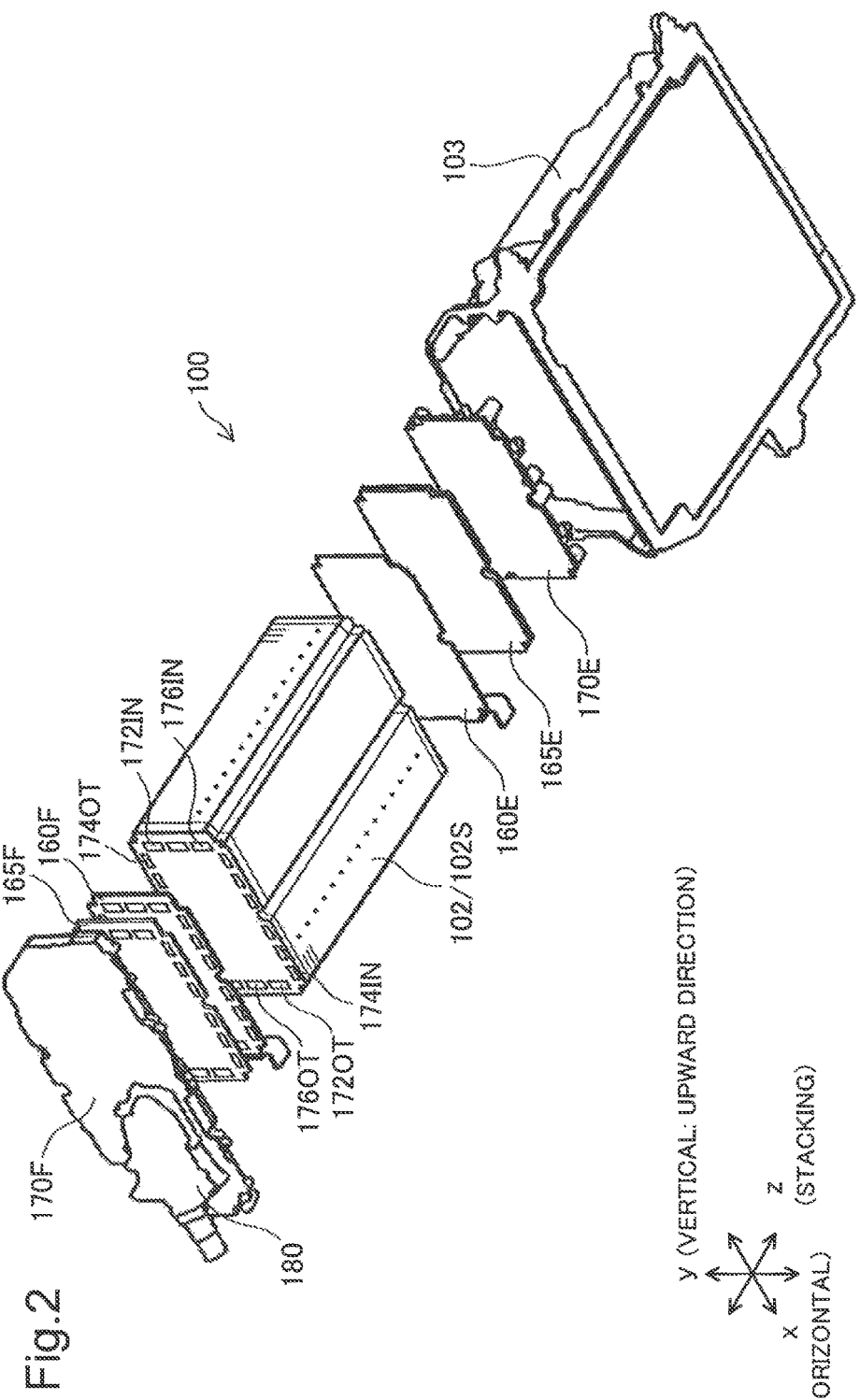
FIG. 2 is a schematic perspective view showing the schematic configuration of a fuel cell when seen from the side of the bottom surface of the vehicle.

FIG. 2 is a schematic perspective view showing the schematic configuration of the fuel cell 100 when seen from the side of the bottom surface of the vehicle. The fuel cell 100 includes a stack-shaped cell stack 102S that is formed by stacking a plurality of unit cells 102 serving as fuel cell cells in layers in a Z direction (hereinafter also referred to as a "stacking direction"). The cell stack 102S is sandwiched between a pair of end plates 170F and 170E, and is fastened, in a cell center lower end and cell corner portions, with unillustrated fastening bolts in the cell stacking direction. The cell stack 102S fastened together with the end plates 170F and 170E is stored in a battery case 103, and is horizontally mounted in the lower portion of the underbody 11 as described above.

The fuel cell 100 has a terminal plate 160F on the front end side between the end plate 170F on the front end side and the cell stack 102S through an insulating plate 165E on the front end side. Similarly, the fuel cell 100 has a terminal plate 160E on the rear end side between the end plate 170E on the rear end side and the cell stack 102S through an insulating plate 165E on the rear end side. The cell stack 102S formed with the unit cells 102, the terminal plates 160F and 160E and the insulating plates 165F and 165E each have a plate structure which has a substantially rectangular outer shape and in which the long sides are arranged along an X direction (horizontal direction) and the short sides are arranged along a Y direction (vertical direction, perpendicular direction).

The insulating plate 165F and the terminal plate 160F on the front end side include a fuel gas supply hole 172IN and a fuel gas discharge hole 172OT, a plurality of oxidizing gas supply holes 174IN and oxidizing gas discharge holes 174OT and a plurality of cooling water supply holes 176IN and cooling water discharge holes 176OT. These supply and discharge holes are coupled to holes (not shown) provided in positions corresponding to the unit cells 102 to form supply and discharge manifolds corresponding to the gases and the cooling water. On the other hand, in the end plate 170E and the insulating plate 165E on the rear end side, these supply and discharge holes are not provided. This is because the fuel cell is a type in which while the reaction gases (the fuel gas and the oxidizing gas) and the cooling water are supplied from the end plate 170F on the front end side to the unit cells 102 through the supply manifold, a discharge gases and discharge water from the unit cells 102 are discharged from the end plate 170F on the front end side to the outside through the discharge manifold. However, the fuel cell is not limited to this configuration, and for example, various types such as a type in which the reaction gases and the cooling water are supplied from the end plate 170F on the front end side and the discharge gases and the discharge water are discharged to the outside from the end plate 170E on the rear end side can be adopted.

The oxidizing gas supply holes 174IN are arranged in the outer edge portion of the lower end of the end plate 170F on the front end side along the X direction (the longitudinal direction), and the oxidizing gas discharge holes 174OT are arranged in the outer edge portion of the upper end along the X direction. The fuel gas supply hole 172IN is arranged in the upper end portion in the Y direction (short side direction) of the outer edge portion of the right end of the end plate 170F on the front end side, and the fuel gas discharge hole 172OT is arranged in the lower end portion in the Y direction of the outer edge portion of the left end. The cooling water supply holes 176IN are arranged on the lower side of the fuel gas supply holes 172IN along the Y direction, and the cooling water discharge holes 176OT are arranged on the upper side of the fuel gas discharge holes 172OT along the Y direction.

The terminal plate 160F on the front end side and the terminal plate 160E on the rear end side are the collector plates of the unit cells 102 for the power generation power, and output the power collected from an unillustrated terminal to the outside.

In the end plate 170F of the present embodiment, an injector block 180, which will be described later, is provided by being attached to the outer surface of the plate, and various types of paths through which the gases and the cooling water are passed between the end plate 170E and the cell stack 102S are provided in the back surface of the plate on the back side of the plane of FIG. 2. These paths include: a fuel gas supply path (which is not shown, and the same is true for the other paths) that guides, to the fuel gas supply hole 172IN of the cell stack 102S, the fuel gas jetted from injectors 180a to 180c, which will be described later, of the injector block 180; an oxidizing gas supply path that guides the oxidizing gas (for example, air) to the oxidizing gas supply holes 174IN; an oxidizing gas discharge path that guides, to the outside of the cell, extra oxidizing gas discharged from the oxidizing gas discharge holes 174OT; a fuel gas discharge path that guides, to the outside of the cell, extra fuel gas discharged from the fuel gas discharge hole 172OT; a cooling water supply path that guides the cooling water to the cooling water supply holes 176IN; and a cooling water discharge path that guides, to the outside of the cell, the cooling water discharged from the cooling water discharge holes 176OT.

Figure 3:
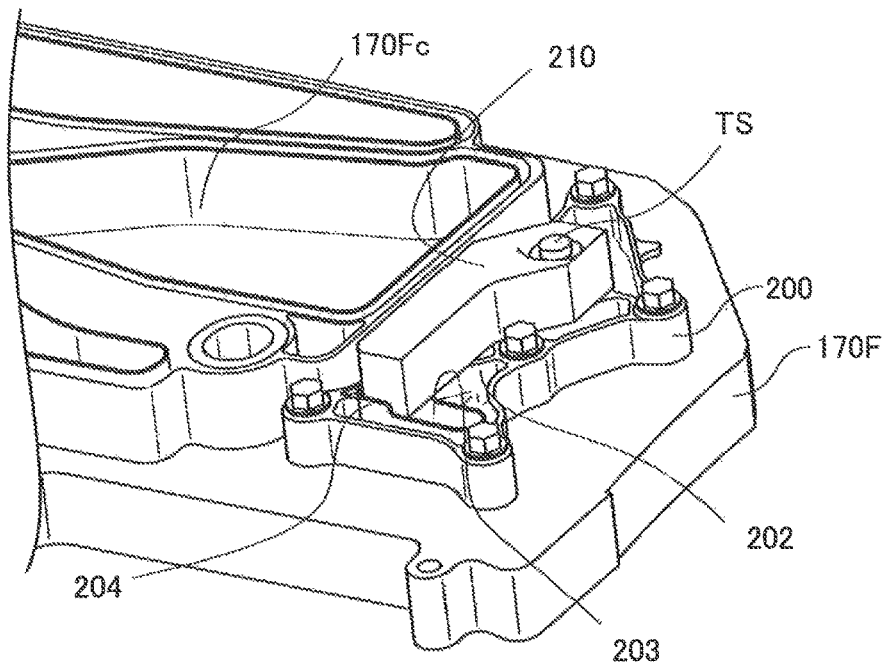
FIG. 3 is a schematic perspective view when an end plate on a front end side of a cell is seen from the side of a fitting surface to a cell stack.
Figure 4:
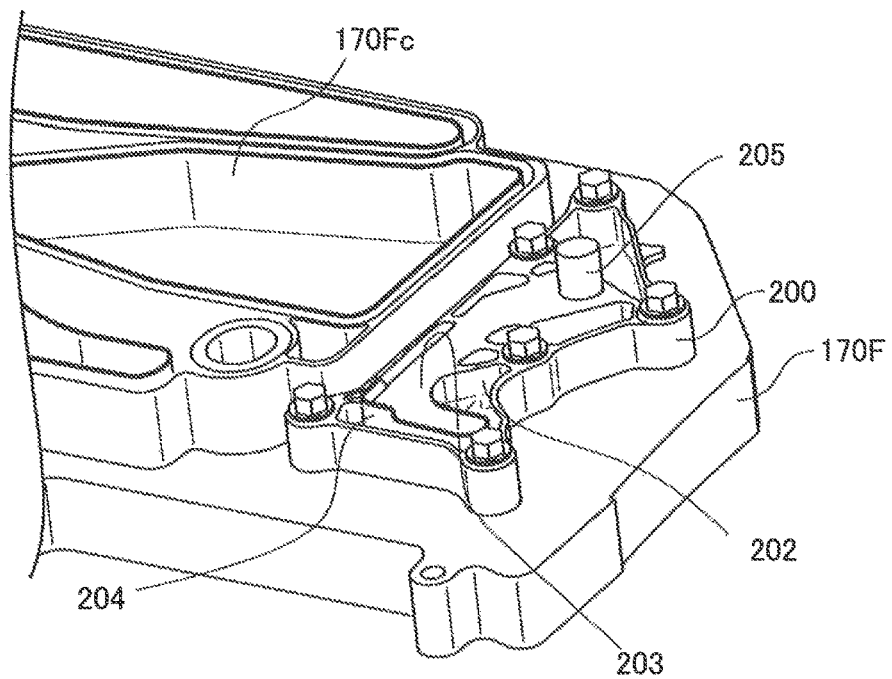
FIG. 4 is a schematic perspective view when the end plate before a sound-absorbing member is attached is seen from the side of the fitting surface.
Figure 5:
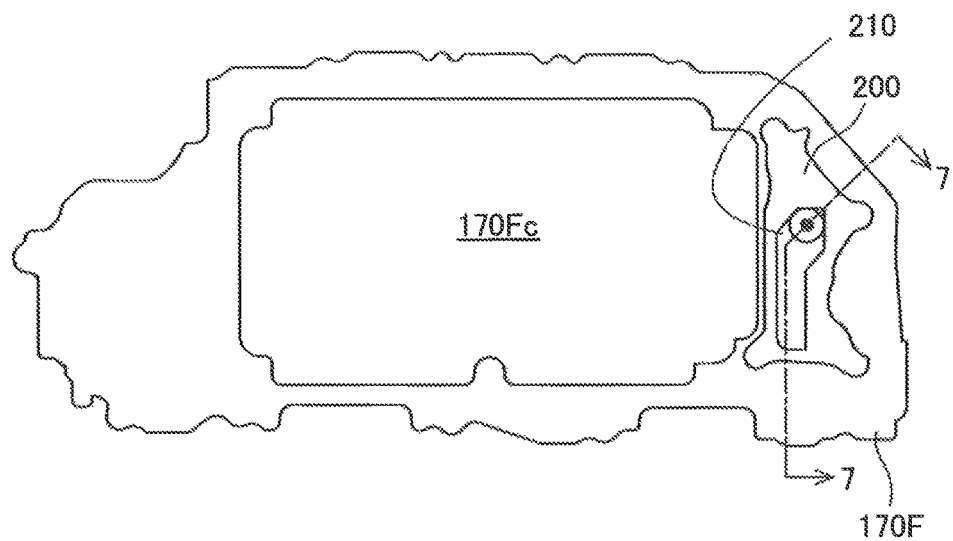
FIG. 5 is an illustrative view showing the end plate when the end plate is seen in plan view from the side of the fitting surface.
Figure 6:
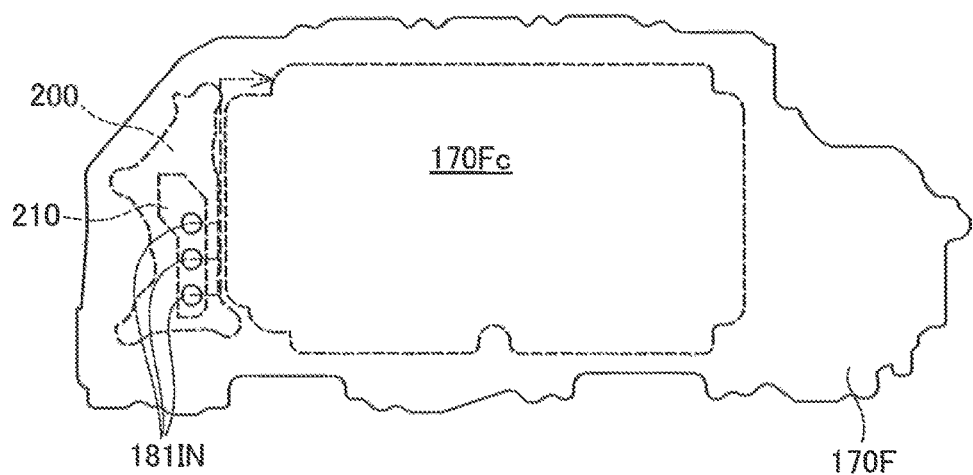
FIG. 6 is an illustrative view showing the end plate when the end plate before an injector block is attached is seen in plan view from the side of the outer surface of the plate.
Figure 7:
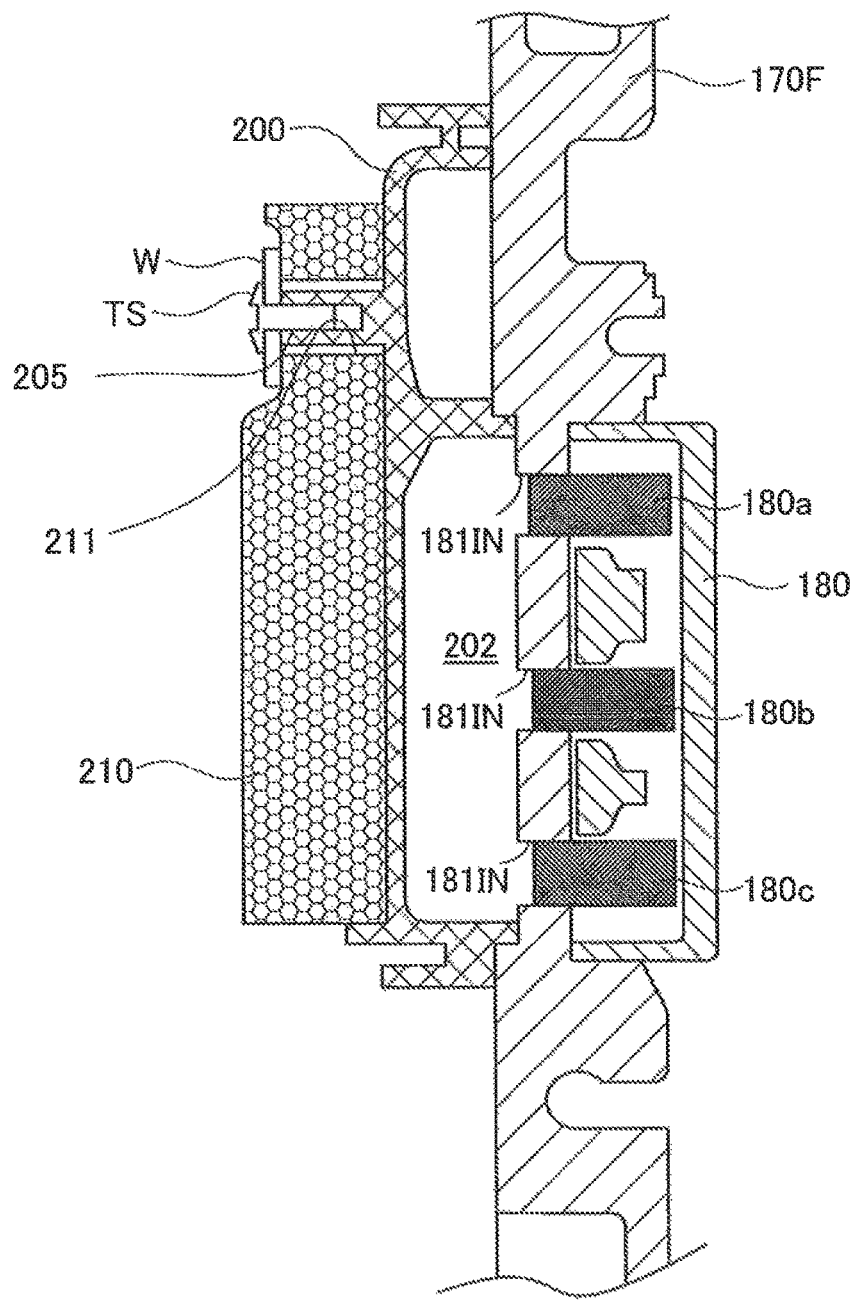
FIG. 7 is an enlarged schematic cross-sectional end surface view of the end plate taken along line 7-7 in FIG. 5.

FIG. 3 is a schematic perspective view when the end plate 170F on the front end side of the cell is seen from the side of a fitting surface to the cell stack 102S, FIG. 4 is a schematic perspective view when the end plate 170F before a sound-absorbing member 210 is attached is seen from the side of the fitting surface, FIG. 5 is an illustrative view showing the end plate 170F when the end plate 170F is seen in plan view from the side of the fitting surface, FIG. 6 is an illustrative view showing the end plate 170F before the injector block 180 is attached when the end plate 170F is seen in plan view from the side of the outer surface of the plate and FIG. 7 is an enlarged schematic cross-sectional end surface view of the end plate 170F taken along line 7-7 in FIG. 5.

As shown in the figures, the end plate 170F has, on the side of the fitting surface to the cell stack 102S, an end plate cover 200 and a cell coupling portion 170Fc and the sound-absorbing member 210 is provided. by being attached to the end plate cover 200. The cell coupling portion 170Fc is formed in a convex shape so as to correspond to the outer shape of the cell stack 102S described above, and has, therewithin, the paths such as the fuel gas supply path described above. The end plate cover 200 is a molded product of a light metal. such as aluminum or a heat-resistant resin, is attached to a plate surface on the outside of the cell coupling portion 170Fc and is arranged in a position opposite the injectors 180a to 180c of the injector block 180 through the end plate 170F. This configuration is schematically shown in FIGS. 6 and 7, and the end plate cover 200 is opposite a gas introduction hole 181IN that receives the gas jetted from the injectors 180a to 180c of the injector block 180 so as to form a gas introduction path 202 which reaches, from the introduction holes, the fuel gas supply path in the cell coupling portion 170Fc of the end plate 170F. The gas introduction path 202 is shown in FIGS. 4 and 7 as a raised path within the cover, and merges the fuel gas jetted to the gas introduction hole 181IN to guide it to the fuel gas supply path of the cell coupling portion 170Fc of the end plate 170F. The fuel gas supply path communicating with the gas introduction path 202 is extended in the cell coupling portion 170Fc to he hermetically connected to the fuel gas supply hole 172IN.

The end plate cover 200 has a sound-absorbing seating surface 203 that is substantially parallel to the plate surface on the outside of the cell coupling portion 170Fc, and surrounds, with a raised wall 204, the seating surface 203 in the corner on the side of the cell coupling portion 170Fc. The sound-absorbing seating surface 203 forms the wall surface (ceiling wall surface) of the gas introduction path 202 (see FIG. 7) formed by the end plate cover 200, and is formed so as to overlap the route of the path, more specifically, so as to overlap the merging passing place of the jetted. fuel gas included in the gas introduction path 202. The sound-absorbing member 210 is a lightweight porous material such as urethane foam, achieves a sound deadening effect and is adhered and attached to the sound-absorbing seating surface 203 such as with a double-faced tape. The raised wall 204 protrudes from the sound-absorbing seating surface 203 so as to correspond to the corner shape of the outer corner portion of the sound-absorbing member 210, makes contact with the outer circumferential wall of the sound-absorbing member 210 attached to the sound-absorbing seating surface 203 and functions as a locating portion. The end plate Cover 200 also has a convex column 205 on the sound-absorbing seating surface 203. The convex column 205 protrudes from the sound-absorbing seating surface 203 and is inserted into a through hole 211 included in the sound-absorbing member 210. As shown in FIG. 7, in a state in which the convex column 205 is inserted into the through hole 211, the sound-absorbing member 210 is pressed and fixed to the sound-absorbing seating surface 203 through a washer W with a tapping screw TS without any gap.

The fuel cell 100 of the present embodiment includes the end plate 170F attached to the side of one end of the cell stack 102S having a stack structure in which a plurality of unit cells 102 serving as power generation units are stacked in layers, and is horizontally mounted in the vehicle interior underfloor region 40 in the lower portion of the underbody 11 partitioning the vehicle interior 20. The fuel cell 100 of the present embodiment mounted on the vehicle 10 as described above has, in the end plate 170F, the end plate cover 200 to which the sound-absorbing member 210 is attached and the injector block 180, and the sound-absorbing member 210 is located in a position opposite the injectors 180a to 180c of the injector block 180 through the end plate 170F via the end plate cover 200. Then, in the fuel cell 100 of the present embodiment, the sound-absorbing member 210 is arranged so as to overlap the gas introduction path 202 of the end plate cover 200 which merges the gas jetted from the injectors 180a to 180c to guide it to the fuel gas supply path in the cell coupling portion 170Fc. Hence, even when vibrations are produced in the injectors or the end plate 170E to which the injectors are attached as the fuel gas is jetted from the injectors 180a to 180c, with the fuel cell 100 of the present embodiment, it is possible to reduce or absorb noise caused by the vibrations with the sound-absorbing member 210 overlapping the gas introduction path 202 of the jetted gas. In addition, the sound-absorbing member 210 contributing to the reduction of the noise is only fixed to the convex column 205 in the state in which the convex column 205 protruding from the sound-absorbing seating surface 203 of the end plate cover 200 is inserted into the through hole 211 of the sound-absorbing member 210. Thus, with the fuel cell 100 of the present embodiment, it is possible to easily locate the sound-absorbing member 210 to the end plate 170F, to simplify the fixing structure, to reduce the space thereof and to reduce a cost produced by the simplification of the structure. Since in the fuel cell 100 of the present embodiment, the existing end plate to which the injector block 180 is attached is simply replaced with the end plate 170F to which the sound absorbing member 210 is attached as described above, it is possible to reduce the manufacturing cost of the fuel cell 100 and thereby reduce the manufacturing cost of the vehicle 10.

In the fuel cell 100 of the present embodiment, when the sound-absorbing member 210 is attached to the end plate cover 200 of the end plate 170F, specifically, to the sound-absorbing seating surface 203, the raised wall 204 is made to protrude so as to correspond to the outer shape of the sound-absorbing member 210 and thus the raised wall 204 is brought into contact with the outer circumferential wall of the sound-absorbing member 210. Hence, in the fuel cell 100 of the present embodiment, since the sound-absorbing member 210 attached to the sound-absorbing seating surface 203 is located to the raised wall 204 as the locating member, it is possible to prevent the sound-absorbing member 210 from being moved casually in the power generation operation of the fuel cell 100 and thereby sustain the noise reduction effect.

In the fuel cell 100 of the present embodiment, the sound-absorbing member 210 attached to the sound-absorbing seating surface 203 of the end plate cover 200 is fixed to the convex column 205 protruding from the sound-absorbing seating surface 203 with the tapping screw TS and the washer W for screwing it from the top surface of the convex portion thereof. Thus, with the fuel cell 100 of the present embodiment, it is possible to easily fix the sound-absorbing member 210 to the sound-absorbing seating surface 203 and conveniently replace it In the fuel cell 100 of the present embodiment, the gas introduction path 202 which merges the gas jetted from the injectors 180a to 180c and which guides it to the fuel gas supply path in the cell coupling portion 170Fc is formed in the end plate cover 200, and the sound-absorbing member 210 is attached to the sound-absorbing seating surface 203 forming the gas introduction path 202. Hence, in the fuel cell 100 of the present embodiment, the sound-absorbing member 210 can be previously fixed to the end plate cover 200, and since the end plate cover 200 to which the sound-absorbing member is fixed is only fixed to the end plate 170F, it is possible to achieve convenience.

The present invention is not limited to the embodiment described above, and can be realized with various configurations without departing from the spirit thereof. For example, the technical features of the embodiments corresponding to the technical features in the aspects described in the part of Sum nary of Invention can be replaced or combined as necessary so that part or the whole of the problems described above is solved or that part or the whole of the effects described above is achieved. When the technical features are not described as necessary features in the present specification, it is possible to delete them as necessary.

Although in the fuel cell 100 of the embodiment described above, the sound-absorbing member 210 is attached to the end plate 170F through the end plate cover 200, as long as the end plate 170F itself forms the gas introduction path 202 of the end plate cover 200, the sound-absorbing member 210 may be directly attached to the end plate 170F. In this case, it is possible to reduce the number of components while reducing or removing the noise. The convex column 205 does not need to he provided on the sound-absorbing seating surface 203 of the end plate cover 200, and in this case, the sound-absorbing member 210 does not need to have the through hole 211. In this case, it is possible to reduce the manufacturing cost of the end plate cover 200 and the sound-absorbing member 210 and the processing cost while reducing or removing the noise.

Although in the fuel cell 100 of the embodiment described above, the convex column 205 is made to be inserted into the through hole 211, and the sound-absorbing member 210 is fixed. with the tapping screw TS, instead of the through hole 211, a hole with a bottom is provided in the sound-absorbing member 210, and in the state in which the convex column 205 is inserted into the hole with the bottom, the sound-absorbing member 210 may be fixed, with the tapping screw TS, together with the bottom of the hole.

Although in the fuel cell 100 of the embodiment described above, the raised wall 204 is used as the locating portion, instead of this configuration, in the portion where the sound-absorbing member is attached, the locating portion may be formed with a protrusion or a convex that interferes with the circumferential wall of the sound-absorbing member. Although in the embodiment described above, the convex column 205 functions as the fixing portion of the sound-absorbing member 210, it may function as the locating portion of the sound-absorbing member 210.

This application claims priority to Japanese Patent Application (Application No. 2013-233204) whose title of invention is "fuel cell" and which was filed on Nov. 11, 2013 the entire disclosure of which is hereby incorporated by reference.

What is claimed is:

1. A fuel cell comprising:
a cell stack configured to have a stack structure including a plurality of cells as power generation units being stacked in layers;
an end plate attached to one end of the cell stack;
an injector attached to one side of the end plate and configured to jet a fuel gas;
a path provided in an other side of the end plate so as to guide the fuel gas jetted from the injector to the cell stack; and
a sound-absorbing member attached to a portion of a plate surface on the other side of the end plate which corresponds to the path,
wherein the end plate has a convex portion formed on the plate surface on the other side of the end plate,
the sound-absorbing member has an insertion portion to which the convex portion is inserted, and
the end plate fixes the sound-absorbing member to the convex portion in a state in which the convex portion is inserted to the insertion portion of the sound-absorbing member.

2. The fuel cell according to claim 1,
wherein the end plate has a locating portion for locating the sound-absorbing member in the portion to which the sound-absorbing member is attached.

3. The fuel cell according to claim 1,
wherein the sound-absorbing member is fixed to the convex portion with a screw that is screwed to the convex portion from a top surface of the convex portion.

4. The fuel cell according to claim 1,
wherein the end plate has an end plate cover that forms the path, the plate surface is an outer surface of the end plate cover and the convex portion is formed on the end plate cover.

5. The fuel cell according to claim 2,
wherein the sound-absorbing member is fixed to the convex portion with a screw that is screwed to the convex portion from a top surface of the convex portion.

6. The fuel cell according to claim 2,
wherein the end plate has an end plate cover that forms the path, the plate surface is an outer surface of the end plate cover and the convex portion is formed on the end plate cover.

7. The fuel cell according to claim 3,
wherein the end plate has an end plate cover that forms the path, the plate surface is an outer surface of the end plate cover and the convex portion is formed on the end plate cover.

* * * * *